United States Patent [19]

Yarwood et al.

[11] 4,032,124
[45] June 28, 1977

[54] APPARATUS AND METHOD FOR IN-LINE DEGASSING AND FILTRATION OF MOLTEN METAL

[75] Inventors: John C. Yarwood, Madison, Conn.; James E. Dore, Ballwin, Mo.; Robert K. Preuss, Middletown, Conn.

[73] Assignee: Swiss Aluminium Ltd., Chippis, Switzerland

[22] Filed: Feb. 2, 1976

[21] Appl. No.: 654,724

Related U.S. Application Data

[63] Continuation-in-part of Ser. Nos. 563,213, March 28, 1975, Pat. No. 3,962,081, and Ser. No. 597,963, July 21, 1975.

[52] U.S. Cl. .............................. 266/218; 266/231; 266/217
[51] Int. Cl.² .................... C22B 9/02; C22B 9/10
[58] Field of Search .......... 266/217, 227, 229, 230, 266/231; 210/69, 510, 455; 75/68 R, 93 E; 164/134, 358

[56] References Cited

UNITED STATES PATENTS

| 3,737,304 | 6/1973 | Blayden et al. | 210/69 X |
| 3,753,690 | 8/1973 | Emley et al. | 75/68 R |

Primary Examiner—Gerald A. Dost
Attorney, Agent, or Firm—Robert H. Bachman; Robert A. Dawson

[57] ABSTRACT

The disclosure teaches an improvement in the degassing and filtration of molten metal, especially aluminum, using an apparatus which employs a pair of sequentially placed, removable filter-type plates and at least one fluxing gas inlet positioned therebetween. Fluxing gas is provided to the melt through the inlet and flows upward through the first of said plates into counter-current contact with the melt. Said plate serves to break up said fluxing gas into a fine dispersion to assure its intimate and extensive contact with the melt. Dissolved gases and non-metallic inclusions are thereby abstracted and removed from the melt.

13 Claims, 3 Drawing Figures

APPARATUS AND METHOD FOR IN-LINE DEGASSING AND FILTRATION OF MOLTEN METAL

CROSS REFERENCE TO RELATED APPLICATION

The present application is a Continuation-In-Part of copending application Ser. Nos. 563,213 now U.S. Pat. No. 3,962,081 and 597,963, filed respectively on Mar. 28, 1975 and July 21, 1975, by the inventors herein.

BACKGROUND OF THE INVENTION

The present invention relates to the degassing and filtration of molten metal, and particularly to the treatment of said metal with a fluxing gas.

Molten metal, particularly molten aluminum, in practice generally contains entrained and dissolved impurities, both gaseous and solid, which are deleterious to the final cast product. These impurities may affect the final cast product after the molten metal is solidified, whereby processing may be hampered or the final product may be less ductile, or have poor finishing and anodizing characteristics. The impurities may originate from several sources. For example, the impurities may include metallic impurities such as alkaline and alkaline earth metals, and occluded hydrogen gas and dissolved surface oxide films which have become broken up and are entrained in the molten metal. In addition, the inclusions may originate as insoluble impurities, such as carbides, borides and others or eroded furnace and trough refractories.

It is naturally highly desirable to improve the degassing and filtration of molten metals in order to remove or minimize such impurities in the final cast product, particularly with respect to molten aluminum and especially, for example, when the resultant metal is to be used in a decorative product, such as decorative trim or sheet, or products bearing critical specifications, such as aircraft forgings and extrusions, and light gauge foil stock. Impurities as aforesaid causes loss of properties such as tensile strength and corrosion resistance in the final solidified alloy and lead to degradation of processing efficiency and loss of properties in the final product. For example, one type of finishing flaw which is particularly significant in decorative trim or sheet is a stringer defect known as a linear defect.

Conventionally conducted gas fluxing processes, such as general hearth fluxing, have involved the introduction of the fluxing gas to a melting or holding furnace containing a quantity of molten metal. This procedure required that the furnace be shut down while the fluxing gas is circulated, so that the metal being treated would remain constant and treatment could take place. This procedure had many drawbacks, among them, the reduced efficiency resulting from the prolonged idleness of the furnace during fluxing, as well as the lack of efficiency due to the low surface area to volume ratio between the gas flux and the molten metal. Further factors comprised the restriction of location to the furnace which permitted to the re-entry of impurities to the melt before casting, and the high emissions resulting from both the sheer quantity of flux required and the location of its circulation.

As an alternative to the batch-type fluxing operations employed as set out above, certain fluxing operations were employed in an in-line manner; that is, the operation and associated apparatus were located outside the melting or holding furnace and often between the melting furnace and either the holding furnace or the holding furnace and the casting station. This helped to alleviate the inefficiency caused by furnace shut-down, but was not as successful in improving the efficiency of the operation itself, in that undesirably large quantities of fluxing gas were often required per unit of molten metal, which was both costly and detrimental to air purity. Some of these processes utilized in conjunction therewith conventional filter media such as open-weave glass cloth screens, and bed filters made up, for example, of tabular alumina, which both exhibit as a primary disadvantage the inability to maintain a uniform pore size.

Porous ceramic foam materials are known in the art, for example, having been described in U.S. Pat. Nos. 3,090,094 and 3,097,930. These porous ceramic foam materials are known to be particularly useful in filtering molten metal, as described in U.S. Pat. No. 3,893,917 for "Molten Metal Filter" by Michael J. Pryor and Thomas J. Gray, patented July 8, 1975, and also as described in our copending U.S. Pat. application Ser. No. 563,213 for "Ceramic Foam Filter," filed Mar. 28, 1975. Further, an apparatus and method for the filtration of molten metals which employs filter plates prepared from said porous ceramic materials is described in our copending parent application Ser. No. 597,963.

Porous ceramic foam materials are particularly useful for filtering molten metal for a variety of reasons included among which are their excellent filtration efficiency resulting in part from their uniform, controllable pore size, and low cost, as well as ease of use and replaceability. The fact that these ceramic foam filters are convenient and inexpensive to prepare and use has prompted the development of means for easily and conveniently employing these porous, molten metal filters in the in-line degassing and filtration unit which provides a highly efficient assembly.

Accordingly, it is a principal object of the present invention to provide an improved method and apparatus for the degassing and filtration of molten metal which employs filter-type plates of uniform porosity.

It is a particular object of the present invention to provide an apparatus and method as aforesaid which achieves improved degassing by counter-circuit contact between molten metal and fluxing gas taking place within and above one of the filter-type plates.

It is a still further object of the present invention to provide improvements as aforesaid which are convenient and inexpensive to utilize and which results in highly efficient metal degassing and filtration.

Further objects and advantages of the present invention will appear hereinbelow.

SUMMARY OF THE INVENTION

In accordance with the present invention, the foregoing objects and advantages are readily attained.

The present invention comprises a highly efficient degassing and filtration apparatus comprising a chamber having respective metal inlets and outlets, and wall surfaces for the support of at least a first and a second removable filter-type medium in sequential spaced-apart relationship, and at least one conduit providing at least one fluxing gas inlet port positioned between said first and said second medium, wherein said port is so positioned that fluxing gas issuing therefrom is capable of dispersion and percolation through said first medium. The filter-type media differ in pore size and permeability whereby said first medium possesses a relatively coarser pore structure, higher permeability and larger available flow area than said second medium. In a preferred embodiment, filter-type media are provided which possess an open cell structure characterized by a plurality of interconnected voids, and are preferably prepared from a ceramic foam wherein said voids are surrounded by ceramic material. The filter media may comprise plates having bevelled peripheral surfaces adapted to mate with bevelled wall surfaces on said chamber. A resilient sealing means is provided on each of said bevelled filter plate surfaces which is resistant to said molten metal to sealably engage the bevelled wall surfaces of said chamber upon installation of the filter plates.

In accordance with the method of the present invention, degassing and filtration of molten metal is conducted by the passage of a melt through a chamber wherein said melt travels through at least two sequentially placed, spaced-apart filter-type media, whereby said melt is brought into counter-current contact with a fluxing gas while within and above the first of said media, said fluxing gas, having issued from at least one inlet port provided within said chamber between the first and second of said media, dispersing and percolating up into contact with said melt within said first medium.

During the operation of the present method, the surface of said first filter-type medium is maintained below the level of the melt. The method may employ a fluxing gas such as an inert gas, preferably carrying a small quantity of an active gaseous ingredient such as chlorine or a fully halogenated carbon compound. Optionally, a supernatant salt cover comprised of alkali and alkaline earth chlorides and a fluoride may be located on the surface of said melt residing above the first of said filter-type media.

The present apparatus and method provide a considerable increase in productivity in the degassing of molten metal as degassing is conducted without interruptions of the melting furnace. Further, the design of the apparatus enables its placement near to the casting station, whereby the possibility of further impurities entering the melt is substantially eliminated.

The employment of the filter-type medium of the present invention in the above apparatus enables the gaseous flux to achieve a greater dispersion throughout the melt whereby greater surface areas of flux contact with a unit of melt volume is achieved. The improved kinetics attributable to the present invention contribute to its greater efficiency.

In addition, the efficiency of the present invention permits degassing to be conducted with a sufficiently lowered amount of flux material whereby the level of effluents resulting from the fluxing operation is greatly reduced.

The present apparatus and method provide considerable increase in productivity in the degassing of molten metal as degassing is conducted without interruption of the melting furnace. Further, the design of the apparatus permits its placement near to the casting. The present invention enables the operation of a fluxing and filtering process which achieves significant reduction in the level of effluents normally resulting from processing of this kind.

By virtue of the employment of conveniently removable filter-type media possessing a carefully controlled gradation of filter properties, the apparatus and method of the present invention are capable of achieving levels of melt purity heretofore attainable only with the most rigorous of processing. Also, the employment of a relatively coarse first filter-type medium to abstract larger entrained non-metallic particulate before the melt reaches the second fine filter greatly extends the useful life of the latter. In addition, these high levels of purity are attained utilizing inexpensively manufactured filter-type media.

DETAILED DESCRIPTION

Figure 1:
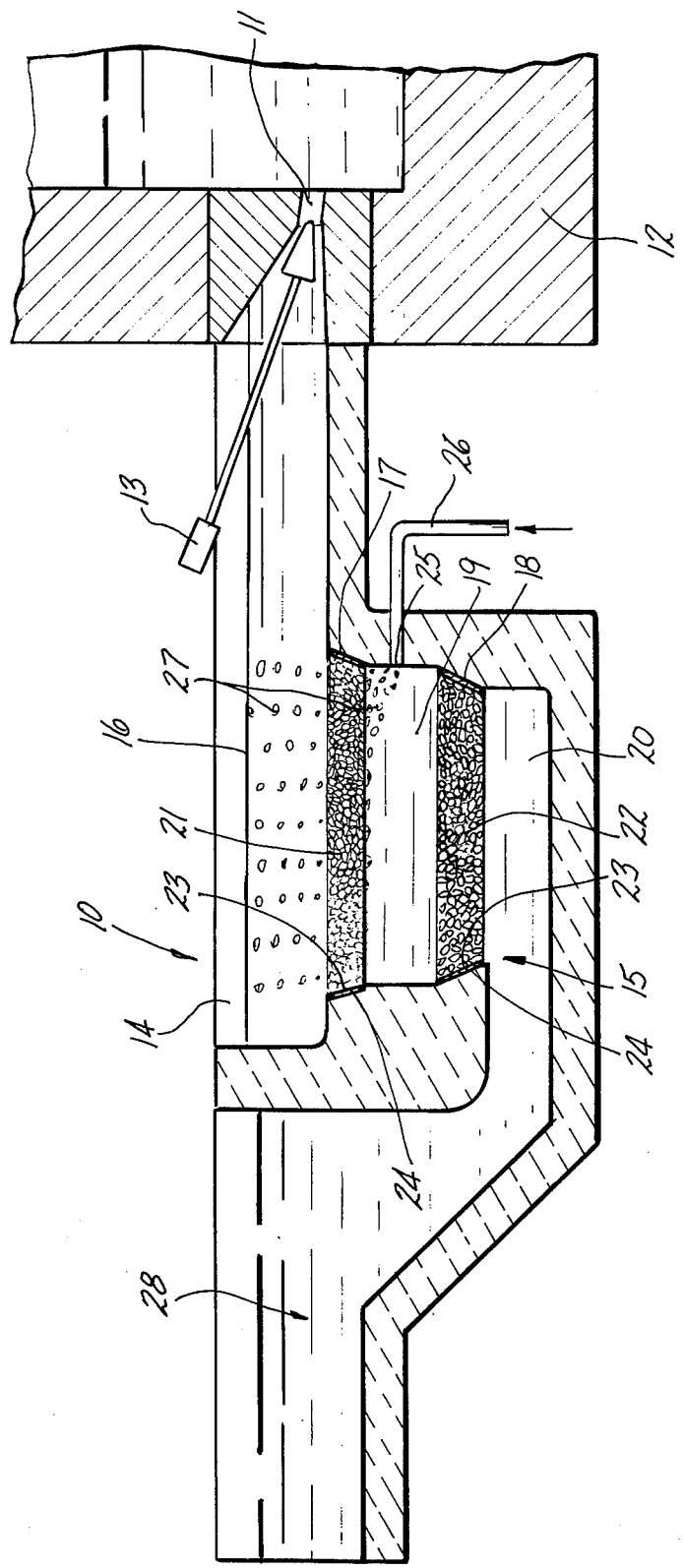
FIG. 1 is a side sectional view of the apparatus of the present invention depicting the filter-type plates in place therein substantially horizontally disposed.

Referring to FIG. 1, an apparatus is illustrated in location within a molten metal transfer system which may include pouring pans, pouring troughs, transfer troughs, metal treatment bays or the like. As will be discussed later on, the apparatus and method of the present invention may be employed in a wide variety of locations occurring intermediate the melting and casting stations in the metal processing system. Thus, FIG. 1 depicts apparatus 10 in location adjacent the exit port 11 of a holding furnace 12. The rate of flow of metal from holding furnace 12 is controlled by a valve means comprising a check rod 13. Metal flows into apparatus 10 via a short transfer passageway 14 leading to chamber 15 wherein the degassing and filtration operations of the present invention take place. By the control of metal flow into transfer passageway 14 by the positioning of check rod 13, melt level 16 is maintained at a point above the first of said filtertype media, at a level depicted in FIG. 1 selected for purposes of illustration only.

Chamber 15 is illustrated as roughly bowl-shaped and is disposed with its bottom recessed below the level of transfer passageway 14 so that molten metal traveling thereto will flow downwardly through the filter-type media. Chamber 15 is characterized by the provision of at least two peripheral rims 17 and 18, comprising, respectively, a first and a second peripheral rim. First peripheral rim 17 is located at the upper portion of chamber 15 and, in FIG. 1 is positioned at a level continuous with the bottom of transfer passageway 14. Second peripheral rim 18, as depicted in FIG. 1, is disposed within chamber 15 so as to effectively divide it into sub-chambers 19 and 20. As with first peripheral rim 17, second peripheral rim 18 is illustrated in the FIGURES as defining a downwardly converging bevelled surface which enables the expeditious installation and replacement of appropriately configured filter-type media. Through rims 17 and 18 are illustrated as having bevelled surfaces, the invention is not limited thereto, as rims possessing other means for retaining in place the filter-type media of the present invention may be employed as will be noted later on. Rim 18 is shown to be reduced in size from first rim 17 to enable the unobstructed manipulation of the filter medium located therein.

First sub-chamber 19 comprises the area residing between the first and second filter-type media labeled 21 and 22, respectively. As illustrated herein, filter-type media 21 and 22 may likewise possess bevelled peripheral surfaces 23 adapted to mate with correspondingly configured peripheral rims 17 and 18. The bevelled peripheral surfaces 23 when employed are provided with resilient sealing means 24 thereon which are resistant to molten metal, and the respective filter media 21 and 22, including sealing means 24 are sequentially inserted into chamber 15 so that sealing means 24 in each instance engages the respective bevelled surfaces of rims 17 and 18.

As noted earlier, the provision of peripheral rims 17 and 18 supporting respective filter media 21 and 22 effectively divides chamber 15 into sub-chambers 19 and 20. Referring again to FIG. 1, in accordance with the present invention sub-chamber 19 is provided with at least one inlet ort 25 comprising the opening or openings of a conduit 26 or manifold through which a fluxing gas maybe introduced to the melt from an outside source, not shown. The flux material which may be employed in the present apparatus and method comprises a wide variety of well-known components including chlorine gas and other halogenated gaseous materials, carbon monoxide as well as certain inert gas mixtures derived from and including nitrogen, argon, helium and the like. A preferred gas mixture for use in the present invention comprises a mixture of nitrogen with from about 0.1 to about 5% by volume dichlorodifluoromethane, wherein the inert gas component may further include an inert carrier such as halium, argon and mixtures thereof, and dichlorodifluoromethane may be replaced in whole or in part by chlorine, or fully chlorinated or chlorofluorinated lower hydrocarbon components containing one to six carbon atoms and free of hydrogen. In conjunction with this gas mixture, a liquid salt mixture may be employed on the surface of the melt residing within transfer passageway 14 which would comprise mixtures of alkali and alkaline earth chlorides and a fluoride. A specific such formulation may, for example, include 40–50% NaCl and 5% Na$_3$AlF$_6$. The foregoing flux materials are fully disclosed in U.S. Pat. No. 3,854,934, by James E. Dore et al., commonly assigned, the disclosure of which is incorporated herein by reference. As indicated above, the foregoing compositions are presented for purposes of illustration only and do not form a material limitation on the present invention.

Referring further to FIG. 1, one of the primary features of the present invention comprises the location of the flux inlet comprising port 25 as illustrated herein in relation to the first filter-type medium comprising filter plate 21. Specifically, the placement of port 25 is such that fluxing gas issuing therefrom is capable of percolating up through the melt residing within sub-chamber 19 to pass through first filter-type medium 21 where it is broken up and dispersed, and makes counter-current contact said filter-type medium. It is at this point in filter 21 that the unexpectedly efficient impurity removal takes place whereby relatively coarse undesirable particulate inclusions, undesirable gases and certain dissolved metallic elements are separated from the melt and then percolate up to the melt surface by the counter-current action of the fluxing gas, where thel particulate material may be subsequently removed if so desired by conventional surface treatment techniques, such as skimming and the like. The action of the fluxing gas is schematically illustrated in FIG. 1 wherein the gas is depicted as a plurality of bubbles 27 issuing from inlet port 25 and passing through and above filter medium 21 to the melt surface or level 16. Further, though not illustrated herein, melt surface 16 may optionally possess thereon the liquid salt cover noted earlier in conjunction with a preferred fluxing material useful with the present invention.

After contacting the fluxing gas upon passage through filer medium 21, the molten metal flows through sub-chamber 19 and continues through filter medium 22 comprising in the illustration a filter plate possessing a relatively fine pore size. Whereas the primary purpose of first filter-type medium 21 is to break up the fluxing gas into a fine dispersion to assure intimate and extensive contact with the melt, the purpose of second filter-type medium 22 is to removed any remaining non-metallic particulate material from the melt as it passes therethrough. Thus, the molten metal issuing from filter medium 22 into second sub-chamber 20 is purified and is ready for transfer to either a casting station or, if desired, further processing, through exit trough 28.

A futher primary feature of the present invention resides in the provision of filer-type media of uniform, close tolerance at a significant reduction in cost. Accordingly, the filter-type medium of the present invention comprises a filter plate such as that illustrated in FIG. 2. Filter plate 29 possesses an open cell structure, characterized by a plurality of interconnected voids, such that the molten metal may pass therethrough to remove or minimize entrained solids from the final cast product, or to facilitate the exchange of impurities between the melt and a fluxing gas. Such a filter may comprise, for example, a solid filter plate made from sintered ceramic aggregate, or a porous carbon plate. In the preferred embodiment, a ceramic foam filter is utilized as described in the aforesaid copending application Ser. No. 563,213. In accordance with the teaching of said copening application, ceramic foam filters may be prepared which have an open cell structure characterized by a plurality of interconnected voids surrounded by a web of said ceramic material. The ceramic filters have an air permeability in the range of from 400 to 8000 × 10$^{-7}$ cm$^2$, preferably from 400 to 2500 × 10$^{-7}$ cm$^2$, a porosity or void fraction of 0.80 to 0.95 and from 5 to 45 pores per linear inch, preferably from 20 to 45 pores per linear inch. The molten metal flow rate through the filter may range from 5 to 50 cubic inches per square inch of filter area per minute. The ceramic foam filter described in said Ser. No. 563,213 is particularly suitable in the present invention since it is of low cost and may be readily employed on a throwaway basis. Furthermore, this filter is surprisingly effective in the filtration of molten metal, especially aluminum, at a low cost achieving surprising filtration efficiency with considerable flexibility. In accordance with the present invention, first filter-type medium 21 may be prepared of a relatively coarse pore size ranging from 5 to 20 ppi, which possesses an air permeability ranging from 2500 to 8000 × 10$^{-7}$ cm$^2$, while second filter medium 22 would comprise a relatively fine filter possessing a pore count of from 20 to 45 ppi and an air permeability from 400 to 2500 × 10$^{-7}$ cm$^2$. Naturally, as noted earlier, both permeability and pore size of the respective filter-type media may be varied to suit the particular material being filtered, and the present invention should not be limited to the aforenoted exemplary ranges.

The ceramic foam filter preferably utilized in the present invention is prepared from an open cell, flexible foam material having a plurality of interconnected voids surrounded by a web of said flexible foam material, such as polyurethane foams or cellulosic foams. The ceramic foam filter may be prepared in accordance with the general procedure outlined in U.S. Pat. No. 3,893,917 wherein an aqueous ceramic slurry is prepared and the foam material impregnated therewith so that the web thereof is coated therewith and the voids substantially filled therewith. The impregnated material is compressed so that a portion of the slurry is expelled therefrom and the balance uniformly distributed throughout the foam material. The coated foam material is then dried and heated to first burn out the flexible organic foam and then sinter the ceramic coating, thereby providing a fused ceramic foam having a plurality of interconnected voids surrounded by a web of bonded or fused ceramic in the configuration of the flexible foam. Naturally, a wide variety of ceramic materials may be chosen depending upon the particular metal to be filtered. Preferably, a mixture of alumina and chromia is employed, however, these materials may naturally be utilized separately or in combination with other ceramic materials. Other typical ceramic materials which may be employed include zirconia, magnesia, titanium dioxide, silica and mixtures thereof. Normally, the slurry contains from about 10 to 40% of water and one or more rheological agents, binders or air setting agents.

Figure 2:
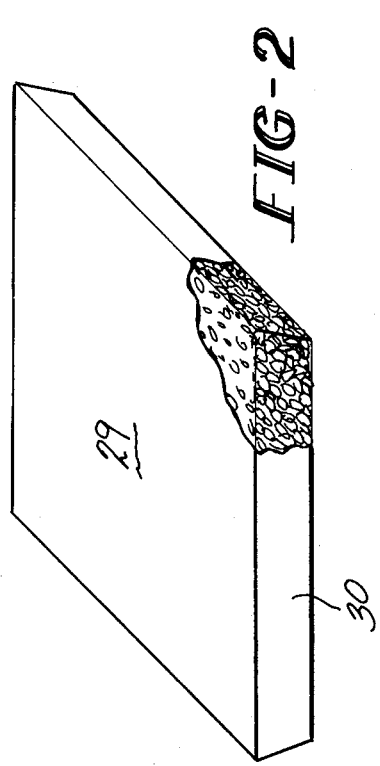
FIG. 2 is a perspective view, partly broken away, of a filter-type medium illustrative of the present invention.
Figure 3:
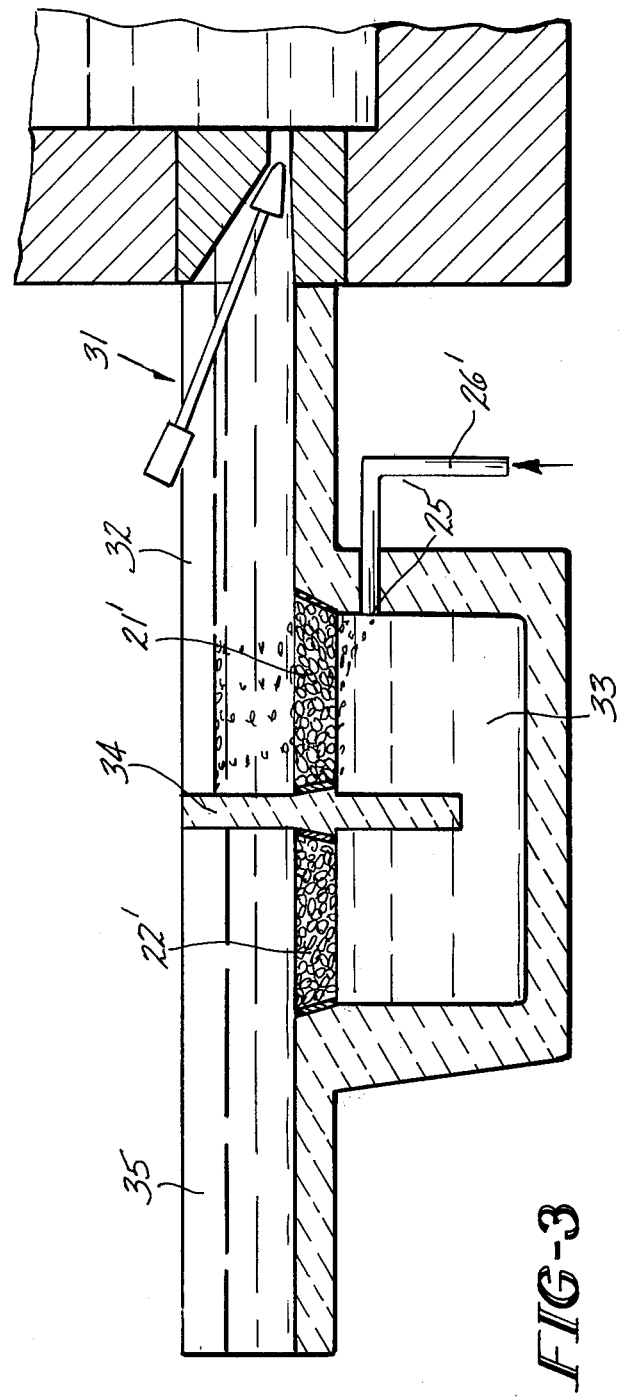
FIG. 3 is a side sectional view of an alternate embodiment of an apparatus in accordance with the present invention wherein the second filter-type medium is disposed in substantially side-by-side relationship to the first medium.

As shown in FIG. 2, the filter plate of the present invention 29 may have a bevelled peripheral surface 30 adapted to mate with the similarly bevelled rims of the filter chamber illustrated in FIGS. 1 and 3. Naturally, variations in design are contemplated within the scope of the present invention and thus a wide variety of geometric configurations may be contemplated within the scope of the apparatus disclosed herein, and the illustration of FIG. 2 is not meant to be limiting thereto.

In the instance where the filter plate of the present invention is designed to be a throwaway item, it is essential to provide an effective means of sealing the filter plate in place in its holder which is easy to assemble, disassemble and clean up. The holder or filter chamber itself is normally an integral part of a trough, pouring pan or tundish, etc. and should be constructed of refractory materials resistant to the molten metal similar to those used in standard trough construction. It is greatly preferred to seal the filter plate in place using a resilient sealing means or gasket type seal as illustrated and discussed earlier, which peripheraly circumscribes the filter plate at the bevelled portion thereof. The gasket type seals ensure a leak free installation and also provide an effective parting medium which is essential for ease of disassembly. In addition, since the gaskets or sealing means prevent ingress of metal to the sealing faces of the holder unit, their use considerably eases clean up and effectively prolongs the life of the unit by eliminating problems of metal attack. Furthermore, because of its resiliency, the gasket may provide sufficient frictional force to hold the filter body in place in the holder or filter chamber without resort to other types of hold down devices. The resilient sealing means should be non-wetting to the particular molten metal, resist chemical attack therefrom and be refractory enough to withstand the high operating temperatures.

Plate type filter units of the present invention may be sealed by gaskets around their edges and/or at the periphery of their large faces. The plate type filler units of the present invention are preferably sealed by an edge type seal along the peripheral surface of the filter plate thus providing a positive seal and, in conjunction with the gasket, a mechanical advantage to hold the filter inplace. In the event that a simple press fit is insufficient to hold the filter in place, naturally a variety of mechanical devices such as wedges and hold down weights may be employed. Alternatively, apparatus 10 in FIG. 1 can be made to be split at rims 17 and 18, in a manner not shown, so that pressure can be applied to the seals by the vise-like action of closing the split unit. The bevelled angle of the filter chamber and corresponding bevelled angle of the filter plate tends to form a positive seal and hold the filter in place against buoyancy forces acting thereupon. Naturally, as indicated above, the gasket or seal should be resistant to the molten metal utilized Typical seal materials utilized in aluminum processing include fibrous refractory type seals of a variety of compositions, as the following illustrative seals: (1) a seal containing about 45% alumina, 52% silica, 1.3% ferric oxide and 1.7% titania; (2) a seal containing about 55% silica, 40.5% alumina, 4% chromia and 0.5% ferric oxide; and (3) a seal containing about 53% silica, 46% alumina and 1% ferric oxide.

In accordance with a further embodiment of the present invention, an apparatus 31 is depicted in FIG. 3 which comprises a transfer passageway 32 leading to a continuous filter chamber 33. Chamber 33 differs from chamber 15 of FIG. 1 in that it is continuous rather than partitioned into sub-chambers. In this embodiment, coarse filter-type medium 21' is located in essentially side-by-side relationship with fine filter-type medium 22'. The respective filter-type media are separated by partition wall 34 which is integral with and of identical height to transfer passageway 32 and exit trough 35. As in the apparatus of FIG. 1, a flux inlet port 25' is located in chamber 33 adjacent and below filter medium 21' and is fed in a similar manner by conduit 26'. Thus, flux material comprising a gaseous fluxing agent may issue from port 25' and will percolate through filter medium 21' to achieve the desired counter-current contact and exchange with the downwardly moving melt. The difference in the configuration of chamber 33 dictates that the melt will flow downward around partition wall 34 and will receive its final filtration as it passes upward through filter medium 22' on its way to exit trough 35. As in the illustration of FIG. 1, apparatus 31 is provided with bevelled peripheral rims to accommodate the placement and support of the respective filter media. Likewise, the filter media are provided with resilient sealing means to effect the desired securement of the filters within the rims.

A wide variety of instances exist where the apparatus and method of the present invention in all of the above dislcosed variations may be employed. Specifically in the instance of a continuous casting operation, a pair of flux filtration chambers may be employed in parallel arrangement. In such an operation, the great length and associated total flow of metal involved may require the frequent changing of filter media in mid-run. Such changes may be facilitated by the employment of parallel flow channels each containing a filtration chamber, together with a means for diverting flow from one channel to the other, by valves, dams or the like. Flow would thus be restricted to one filtration chamber at a time and would be diverted to an alternate channel once the head drop across the first filtration chamber became excessive. It can be seen that such a switching procedure could supply an endless stream of filtered metal to a continuous casting station.

In addition to the above, the present apparatus and method are capable of several modifications within the scope of the invention to accommodate variations in operating procedure. For example, in the instance where small, individual lots of molten metal are prepared and cast, it is desirable that the filter-type media remain operable for several such lots. To this end, the filter media may be recessed somewhat from the levels of the transfer passageway and exit trough whereby, after melt flow has ceased, residual melt remains which fills the chamber and covers both filters. In conjunction with this modification, at least one cover unit may be employed which would reside above the remaining melt, and would be provided with heating means such as a plurality of radiant heaters to keep the melt in the liquid state. In the event that such modifications are employed with the apparatus of FIG. 1, peripheral rim 17 would be recessed and the cover member, not illustrated herein, would be placed thereover. Likewise, the bottom of exit trough 28 would be brought into alignment with the bottom of passageway 14 and a similar cover member would be employed at the location where the exit area of sub-chamber 20 abuts with trough 28. In the illustration of FIG. 3, filter-type media 21' and 22' could simply be recessed to permit the residence of melt thereover, and appropriately configured cover members could be located thereat.

Other modifications contemplated within the scope of the invention include the provision of a plurality of inlet ports surrounding the respective chambers immediately below the respective first filter-type media. In addition, and likewise not illustrated herein, the inlet ports could be extended to the center of said chambers by the extension of the respective conduits thereinto, whereby fluxing gas may enter the melt from a point centrally located within the chamber. Both the provision of a manifold of fluxing gas inlet ports, and an inlet port or ports centrally located within the chamber, neither of which illustrated herein, comprise modifications which are, themselves, subject to alterations of design, etc., and accordingly, the invention should not be strictly interpreted thereby.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. An apparatus for the degassing and filtration of molten metal which comprises a chamber having respective metal inlets and outlets, wall surfaces adapted for the support of at least a first and a second removable filter plate, and a first coarse grade ceramic foam filter plate located upstream in the flow of molten metal through said apparatus, and a second fine grade ceramic foam filter plate located spaced-apart and downsteam from said first filter plate in said molten metal flow, and a conduit providing a fluxing gas inlet port positioned between said first and said second filter plate in such relation to said first filter plate that fluxing gas issuing from said port is capable of percolation in a direction counter-current to said molten metal flow, through molten metal located adjacent thereto and into contact with said first filter plate for passage therethrough.

2. The apparatus of claim 1 wherein said filter plates have peripheral surfaces adapted for mating relationship with said wall surfaces.

3. The apparatus of claim 2 further including resilient sealing means in engagement between said mating surfaces, said sealing means resistant to said molten metal.

4. The apparatus of claim 3 wherein said sealing means is a ceramic gasket.

5. The apparatus of claim 2 wherein said ceramic foam filter plates have an open cell structure characterized by a plurality of interconnected voids surrounded by a web of said ceramic.

6. The apparatus of claim 5 wherein said filter plates have air permeabilities ranging from 400 to 8000 × $10^{-7}$ cm², porosities of 0.80 to 0.95, pore sizes of 5 to 45 ppi and thicknesses of from ½ to 4 inches.

7. The apparatus of claim 5 wherein said coarse filter plate possesses an air permeability ranging from 2500 to 8000 × $10^{-7}$ cm² and a pore size of from 5 to 20 ppi, and said fine filter plate possesses an air permeability ranging from 400 to 2500 × $10^{-7}$ cm² and a pore size of from 20 to 45 ppi.

8. The apparatus of claim 2 wherein said mating surfaces are provided with a downwardly converging bevel.

9. The apparatus of claim 1 wherein said mating surfaces are bevelled at substantially the same angle.

10. The apparatus of claim 1 wherein said chamber is partitioned into at least two sub-chambers by the disposition of said filter plates in parallel, stacked relationship therein, and said coarse filter plate is located above said fine filter plate.

11. The apparatus of claim 1 wherein said chamber is partially divided by a vertical partition wall, said filter plates are disposed in side-by-side relationship against opposite surfaces of said wall, and said coarse filter plate and said fine filter plate are disposed in the same plane.

12. The apparatus of claim 1 wherein said fluxing gas is selected from the group consisting of halogenated gaseous materials, inert gases and mixtures thereof.

13. The apparatus of claim 12 wherein there is employed in addition to said fluxing gas, a liquid salt mixture applied directly to the surface of said molten metal.

* * * * *

UNITED STATES PATENT OFFICE
CERTIFICATE OF CORRECTION

PATENT NO. : 4,032,124
DATED : June 28, 1977
INVENTOR(S) : John C. Yarwood, James E. Dore & Robert K. Preuss It is certified that error appears in the above-identified patent and that said Letters Patent are hereby corrected as shown below:

Column 1, line 40, the word "causes" should read ---cause---;

Column 1, line 60, after the word "permitted" the word "to" should be deleted.

Column 2, line 36, the word "the" should read ---an---;

Column 2, line 44, the word "counter-circuit" should read ---counter-current---.

Column 4, line 41, the word "filtertype" should read ---filter-type---;

Column 4, line 61, the word "Through" should read ---Though---.

Column 5, line 19, the word "ort" should read ---port---;

Column 5, line 21, the word "maybe" should read ---may be ---;

Column 5, line 32, the word "halium" should read ---helium---;

Column 5, line 42, after "40-50% NaCl" insert ---, 45-55% KCl---;

Column 5, line 59, after the word "contact" insert ---with molten metal flowing in the opposite direction through---;

Column 5, line 65, the word "thel" should read ---the---.

Column 6, line 10, the word "filer" should read ---filter---;

Column 6, line 17, the word "removed" should read ---remove---;

Column 6, line 24, the word "futher" should read ---further---;

UNITED STATES PATENT OFFICE
CERTIFICATE OF CORRECTION

PATENT NO. : 4,032,124
DATED : June 28, 1977
INVENTOR(S) : John C. Yarwood, James E. Dore & Robert K. Preuss It is certified that error appears in the above-identified patent and that said Letters Patent are hereby corrected as shown below:

Column 8, line 3, the word "filler" should read ---filter---;

Column 8, line 20, after the word "utilized" a period (.) should be inserted.

Column 10, line 6, the word "downsteam" should read ---downstream---.

Signed and Sealed this

Third Day of January 1978

[SEAL]

Attest:

RUTH C. MASON
Attesting Officer

LUTRELLE F. PARKER
Acting Commissioner of Patents and Trademarks